(12) United States Patent
Shimura

(10) Patent No.: US 11,149,468 B2
(45) Date of Patent: Oct. 19, 2021

(54) ELECTRONIC KEY

(71) Applicant: DENSO CORPORATION, Kariya (JP)

(72) Inventor: Tokio Shimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 392 days.

(21) Appl. No.: 16/305,108

(22) PCT Filed: Apr. 12, 2017

(86) PCT No.: PCT/JP2017/014905
§ 371 (c)(1),
(2) Date: Nov. 28, 2018

(87) PCT Pub. No.: WO2017/208634
PCT Pub. Date: Dec. 7, 2017

(65) Prior Publication Data
US 2020/0318387 A1  Oct. 8, 2020

(30) Foreign Application Priority Data

May 31, 2016 (JP) .............................. JP2016-108713

(51) Int. Cl.
*E05B 19/00* (2006.01)
*B60R 25/24* (2013.01)
(Continued)

(52) U.S. Cl.
CPC .......... *E05B 19/0082* (2013.01); *B60R 25/24* (2013.01); *E05B 19/046* (2013.01); *G07C 2009/00952* (2013.01)

(58) Field of Classification Search
CPC ..... B60R 25/24; E05B 19/00; E05B 19/0005; E05B 19/0082; E05B 19/046
See application file for complete search history.

(56) References Cited

U.S. PATENT DOCUMENTS 6,460,386 B1 * 10/2002 Watanuki ............ E05B 19/0082
70/408
6,474,123 B1 * 11/2002 Kito ...................... E05B 19/046
206/37.2

(Continued)

FOREIGN PATENT DOCUMENTS

| JP | 2008082022 A | 4/2008 |
|----|--------------|--------|
| JP | 2013119724 A | 6/2013 |
| JP | 2014111857 A | 6/2014 |

*Primary Examiner* — Christopher J Boswell
(74) *Attorney, Agent, or Firm* — Harness, Dickey & Pierce, P.L.C.

(57) ABSTRACT

An electronic key includes a mechanical key, a case in which to store the mechanical key, and a restraint member provided to the case and restraining the mechanical key from falling out of the case. The mechanical key includes a key engagement plane which is a plane perpendicular to an axial direction of a bar portion in a lock state. The restraint member includes a lock engagement plane which is a plane perpendicular to the axial direction of the bar portion in the lock state and engages with the key engagement plane. At least one of the key engagement plane and the lock engagement plane forms a stepped plane structure including a plurality of engagement planes provided at different positions in the axial direction of the bar portion of the mechanical key and engageable with the other one of the key engagement plane and the lock engagement plane.

9 Claims, 14 Drawing Sheets

(51) Int. Cl.
  *E05B 19/04* (2006.01)
  *G07C 9/00* (2020.01)

(56) References Cited

U.S. PATENT DOCUMENTS

| | | | | |
|---|---|---|---|---|
| 7,448,238 B2* | 11/2008 | Shimura | ............ | E05B 19/0082 70/252 |
| 7,634,932 B2* | 12/2009 | Cadiz | .................. | E05B 19/0082 70/408 |
| 8,359,891 B2* | 1/2013 | Fujimoto | ............ | E05B 19/0082 70/459 |
| 8,479,547 B2* | 7/2013 | Kataya | ................ | E05B 19/0082 70/456 R |
| 8,534,104 B2* | 9/2013 | Shimura | ............... | E05B 19/046 70/456 R |
| 8,550,364 B2* | 10/2013 | Sugimoto | ............. | E05B 19/046 235/492 |
| 9,963,909 B2* | 5/2018 | Watanabe | ........... | E05B 19/0082 |
| 2010/0199729 A1* | 8/2010 | Zaitz | .................... | E05B 19/046 70/237 |
| 2013/0145803 A1 | 6/2013 | Kataya et al. | | |
| 2020/0189519 A1* | 6/2020 | Hyun | .................. | E05B 19/0082 |

* cited by examiner

ELECTRONIC KEY

CROSS REFERENCE TO RELATED APPLICATIONS

This application is a U.S. National Phase Application under 35 U.S.C. 371 of International Application No. PCT/JP2017/014905 filed on Apr. 12, 2017. This application is based on and claims the benefit of priority from Japanese Patent Application No. 2016-108713 filed on May 31, 2016. The entire disclosures of all of the above applications are incorporated herein by reference.

TECHNICAL FIELD

The present disclosure relates to an electronic key with a mechanical key employed in a remote control system to open and close a door.

BACKGROUND ART

An electronic key that includes a mechanical key stored in a case enables a user to open and close a door in the event of a dead battery. Generally, the mechanical key includes a bar portion which is stored in the case of the electronic key.

As is disclosed in Patent Literature 1, the mechanical key stored in the case is generally removable in an axial direction of the bar portion. The case includes a locking mechanism which restrains the mechanical key from falling out of the case.

The locking mechanism disclosed in Patent Literature 1 includes a slide portion. In a lock state, that is, while the slide portion restrains the mechanical key serving as an emergency key from falling out of the case, a tip end of the slide portion fits in a recess provided to the emergency key.

To be more specific, in the lock state, a slope provided at the tip end of the slide portion engages with an inclined surface provided at an opening of the recess in the emergency key.

PRIOR ART LITERATURE

Patent Literature

Patent Literature 1: JP 2014-111857 A

SUMMARY OF INVENTION

According to Patent Literature 1, a surface of the locking mechanism and a surface of the emergency key engaging with each other in the lock state are inclined with respect to the axial direction of the bar portion of the emergency key. Because the two surfaces engaging with each other are inclined with respect to the axial direction of the bar portion of the emergency key, the emergency key is movable in the axial direction of the bar portion of the emergency key in some measure even when the emergency key is in the lock state. Hence, when the emergency key is not inserted fully to an innermost part of the case due to dust or the like, the locking mechanism is capable of maintaining the emergency key in the lock state.

The mechanism disclosed in Patent Literature 1 is thus capable of restraining the emergency key from falling out of the case even when the emergency key is not fully inserted in the case due to dust or the like.

However, because the surface of the locking mechanism and the surface of the emergency key engaging with each other in the lock state are inclined with respect to the axial direction of the bar portion of the emergency key, when the emergency key is pulled, a force to move the slide portion in a direction away from the bar portion is exerted by the emergency key and acts on the slide portion even in the lock state. The slide portion is thus forced to move in a direction away from the bar portion. Consequently, the emergency key keeps moving in the axial direction of the bar portion until a plane provided at the tip end of the slide portion makes contact with a contact surface provided to the recess in the emergency key.

That is, according to Patent Literature 1, when the emergency key is pulled, the emergency key is likely to rattle even in the lock state by a quantity comparable to a length of the slope in the axial direction of the bar portion of the emergency key.

The present disclosure was devised in view of the foregoing circumstances and has an object to provide an electronic key capable of restraining a mechanical key from falling out of a case even when a mechanical key is not fully inserted in a case due to dust or the like while restraining a mechanical key from rattling when a mechanical key is pulled.

An electronic key according to an aspect of the present disclosure includes a mechanical key having a bar portion, a case in which to store the mechanical key in a removable manner in an axial direction of the bar portion, and a restraint member provided to the case and restraining the mechanical key from falling out of the case. The mechanical key includes a key engagement plane which is a plane perpendicular to the axial direction of the bar portion in a lock state in which the mechanical key is restrained from falling out of the case by the restraint member. The restraint member includes a lock engagement plane which is a plane perpendicular to the axial direction of the bar portion in the lock state and engages with the key engagement plane. At least one of the key engagement plane and the lock engagement plane forms a stepped plane structure including a plurality of engagement planes provided at different positions in the axial direction of the bar portion of the mechanical key and engageable with the other one of the key engagement plane and the lock engagement plane.

According to the present disclosure, at least one of the key engagement plane and the lock engagement plane includes the engagement planes provided at different positions in the axial direction of the bar portion of the mechanical key (hereinafter, referred to as axial positions). The engagement planes are engageable with the other engagement plane.

The engagement planes are provided at different axial positions and engageable with the other engagement plane. Hence, any one of the engagement planes at different axial positions with respect to the mechanical key is highly likely to engage with the other engagement plane. Accordingly, even when the mechanical key is not inserted completely due to dust or the like, falling out of the mechanical key can be restrained.

The engagement planes are perpendicular to the axial direction of the bar portion. Hence, even when the mechanical key in the lock state is pulled in the axial direction, the mechanical key does not move in a falling-out direction contrary to Patent Literature 1 in which the lock engagement plane moves in a direction away from the bar portion and the mechanical key is moves in a falling-out direction. Consequently, the mechanical key can be restrained from rattling when the mechanical key is pulled.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
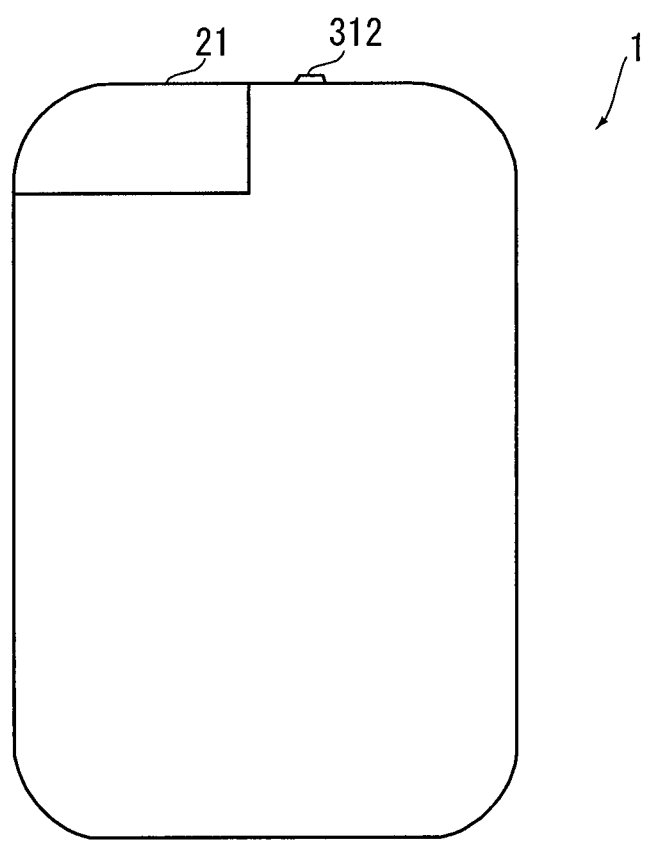
FIG. 1 is a top view of an electronic key according to a first embodiment of the present disclosure.

Hereinafter, embodiments of the present disclosure will be described according to the drawings. FIG. 1 is a top view of an electronic key 1 of a first embodiment. The electronic key 1 sends a signal to switch a door lock of a vehicle from an unlocked state to a locked state and vice versa to a receiver equipped to the vehicle. In FIG. 1, a part of a structure of the electronic key 1, such as a switch, is not shown.

First Embodiment

As is shown in FIG. 1, a planar shape of the electronic key 1 is a rectangular shape with round corners. A planer shape of a case 10 is a shape with one notched corner, and a grip portion 21 of a mechanical key 20 is disposed at the notched corner. The grip portion 21 is therefore exposed from the case 10.

A protrusion 312 of a release hook 31 is provided next to the grip portion 21 and protrudes from the case 10. A thickness of the electronic key 1 is less than a longitudinal length and a lateral length of FIG. 1. In short, the electronic key 1 is of a flattened shape.

[Schematic Internal Configuration]

Figure 2:
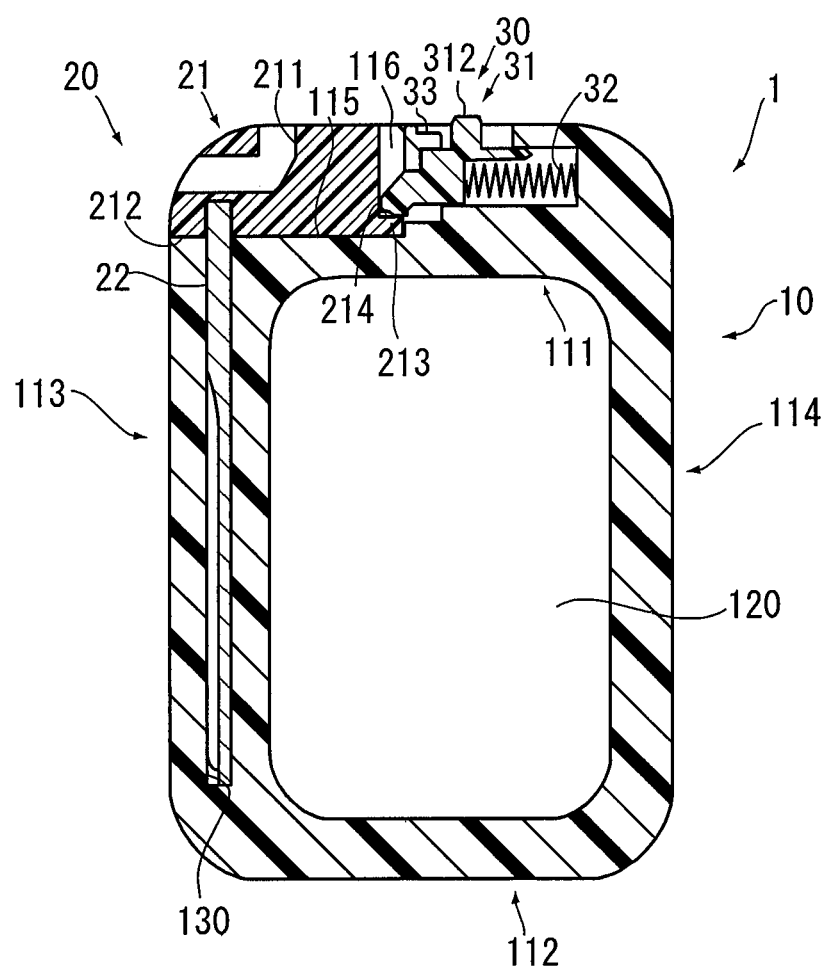
FIG. 2 is a sectional view of the electronic key of FIG. 1 taken along a center line in a thickness direction.

FIG. 2 shows an internal structure of the electronic key 1. The case 10 is made of resin and includes short wall portions 111 and 112 forming relatively short walls, and long wall portions 113 and 114 longer than the short wall portions 111 and 112. An electronic component is stored in a space defined by the short wall portions 111 and 112, the long wall portions 113 and 114, a bottom portion 120, and an unillustrated lid portion facing the bottom portion 120. In FIG. 2, the electronic component is not shown.

The mechanical key 20 includes the grip portion 21 and a bar portion 22. The grip portion 21 is made of same resin as the case 10. The grip portion 21 is provided with a through-hole 211, and a key-holder ring or the like is inserted through the through-hole 211.

The bar portion 22 is made of metal and provided with at least one of a key groove and a key ridge. A base of the bar portion 22 is inserted in the grip portion 21. A door lock of a vehicle can be switched from an unlocked state to a locked state and vice versa also by inserting the bar portion 22 of the mechanical key 20 into a key cylinder in the door of the vehicle.

The long wall portion 113 of the case 10 is provided with a storing hole 130 in which to store the bar portion 22 of the mechanical key 20. A state in which the bar portion 22 of the mechanical key 20 is stored in the storing hole 130 is a state in which the mechanical key 20 is stored in the case 10. While the bar portion 22 is stored in the storing hole 130 at a normal position, a planar case contact surface 212 of the grip portion 21, from which the bar portion 22 protrudes, is in contact with a grip facing surface 115 of the case 10.

While the mechanical key 20 is stored in the case 10, it is necessary to restrain the mechanical key 20 from falling out of the case 10. To satisfy such a necessity, a lock portion 30 is also stored in the case 10. The lock portion 30 is stored in a lock portion storing space 116 provided to the short wall portion 111 of the case 10.

[Configuration of Lock Portion 30]

Figure 3:
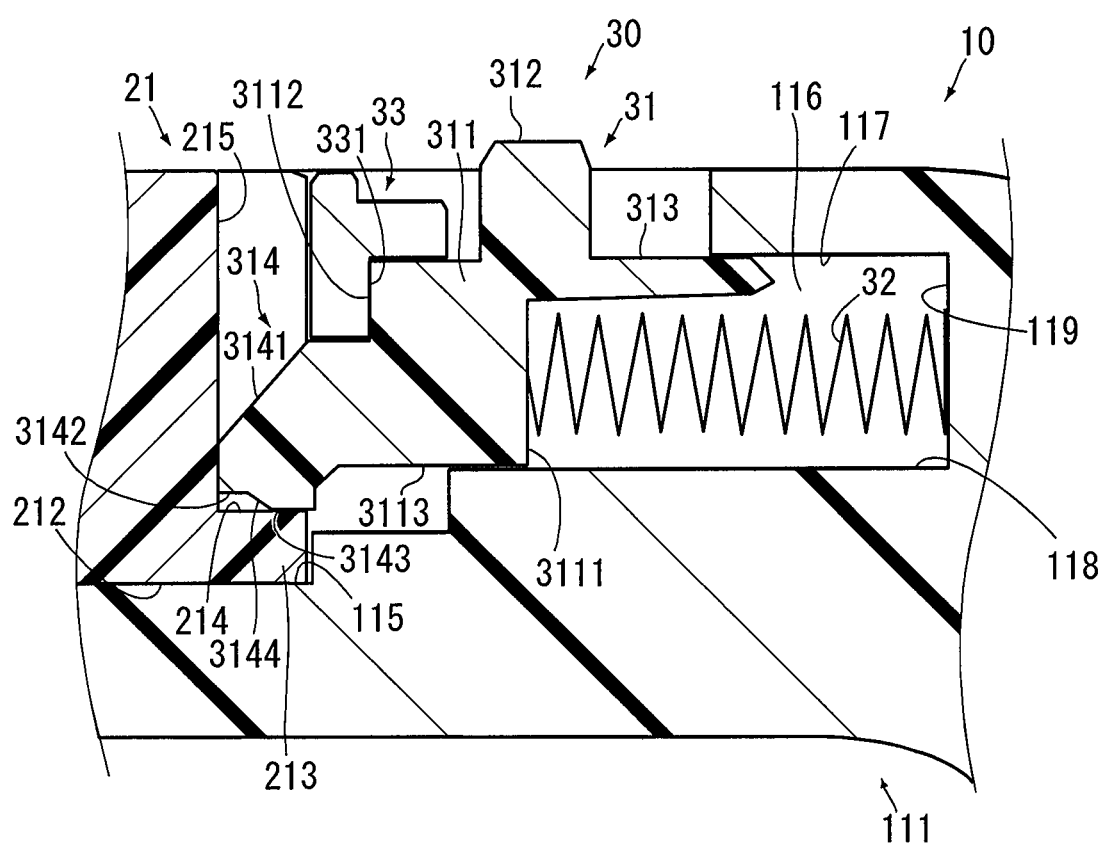
FIG. 3 is an enlarged sectional view of a vicinity of a lock portion of FIG. 2.

The following will describe a configuration of the lock portion 30 and a configuration of only a part of the grip portion 21 related to the lock portion 30 by using FIG. 3. A protrusion 213 provided to the grip portion 21 protrudes in a direction to the lock portion 30 from an end on a side where the case contact surface 212 is provided. A surface of the protrusion 213 on an outer side of the case 10 forms an engagement plane 214 engaging with the lock portion 30. The engagement plane 214 corresponds to a key engagement plane.

The engagement plane 214 is a plane perpendicular to an axial direction of the bar portion 22 of the mechanical key 20, in other words, an insertion and removal direction of the mechanical key 20. In the following description, a key insertion and removal direction means the insertion and removal direction of the mechanical key 20.

The lock portion 30 includes the release hook 31, a spring 32, and a stopper 33 provided to the case 10. The release hook 31 located at a position shown in FIG. 3 restrains the grip portion 21 of the mechanical key 20 from moving in a direction away from the case 10. A state in which the release hook 31 restrains the grip portion 21 of the mechanical key 20 from moving in a direction away from the case 10 is a lock state. The release hook 31 is also made of resin.

Figure 4:
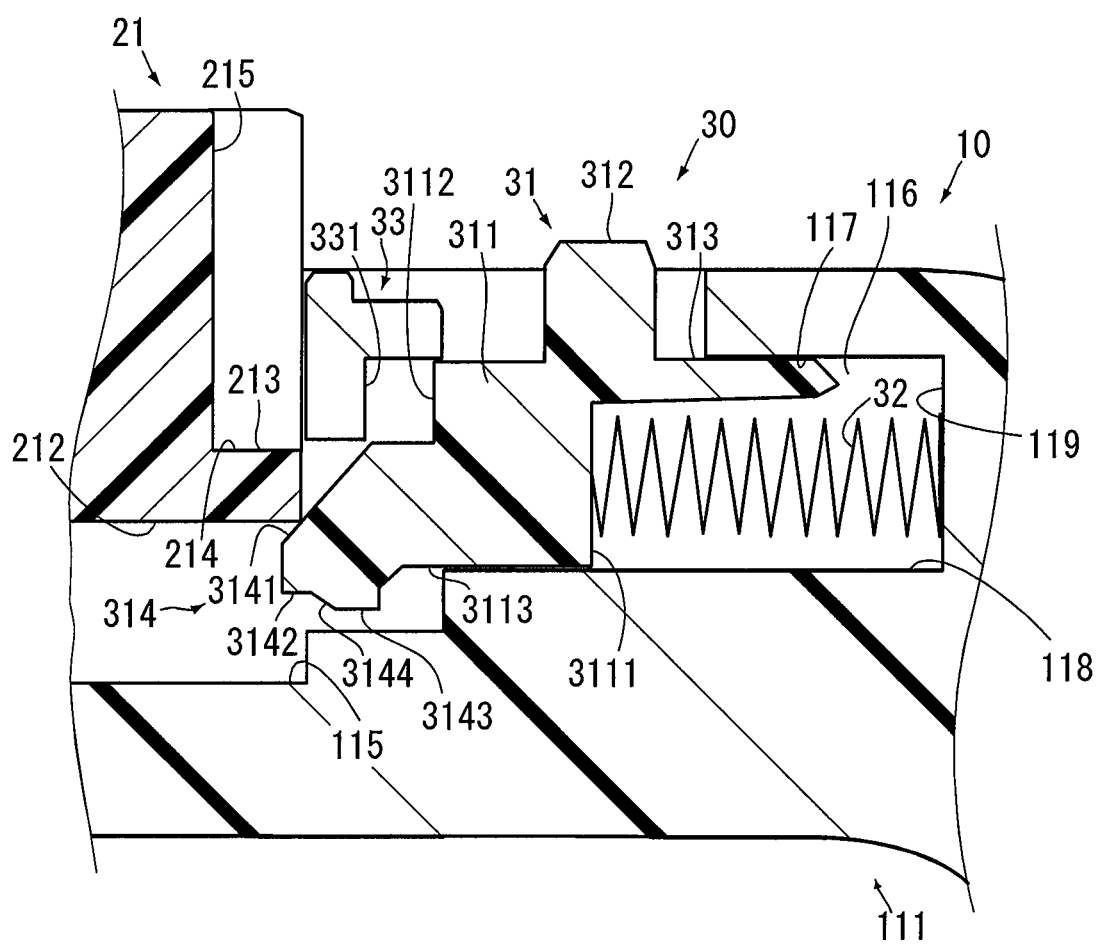
FIG. 4 is a view of a mechanical key while being inserted.

The release hook 31 corresponding to a restraint member includes a center portion 311, the protrusion 312, an outer guide 313, and a tip end portion 314. The center portion 311 is a portion at a center of the release hook 31 and includes a spring contact surface 3111. One end of the spring 32 is in contact with the spring contact surface 3111. The other end of the spring 32 is supported on a support surface 119 provided to the case 10 as a surface facing the spring contact surface 3111. The release hook 31 is energized by the spring 32 in a direction toward the grip portion 21. The spring 32 is a compression coil spring. In FIG. 2 through FIG. 4, the spring 32 is illustrated simply.

The center portion 311 includes a stopper contact surface 3112 on an opposite side to the spring contact surface 3111. When the release hook 31 moves in a direction toward the grip portion 21, the stopper contact surface 3112 makes contact with a hook contact surface 331 provided to the stopper 33. The release hook 31 is no longer allowed to move in a direction to the grip portion 21 once the stopper contact surface 3112 and the hook contact surface 331 make contact with each other.

The protrusion 312 couples to the center portion 311 near the spring contact surface 3111 of the center portion 311 and protrudes from the center portion 311 to a direction to the outer side of the case 10. A tip end of the protrusion 312 protrudes from the case 10 and is therefore operable by a user. By moving the protrusion 312 in a direction against an energizing force of the spring 32, the lock state is cancelled and the mechanical key 20 can be removed from the case 10.

The outer guide 313 protrudes from the spring contact surface 3111 of the center portion 311 in a direction to the support surface 119 of the case 10. The outer guide 313 moves while making contact with an outer guide surface 117 provided to the case 10. Meanwhile, a bottom surface 3113 of the center portion 311 makes contact with an inner guide surface 118 provided to the case 10. The configuration as above allows the release hook 31 to move only in a limited direction along the outer guide surface 117 and the inner guide surface 118. The release hook 31 thus becomes movable in a direction perpendicular to the insertion and removal direction of the mechanical key 20.

The tip end portion 314 protrudes from the center portion 311 in a direction to the grip portion 21, which is a direction opposite to the spring contact surface 3111. The tip end portion 314 includes an outer inclined surface 3141, a first engagement plane 3142, a second engagement plane 3143, and an inner inclined surface 3144.

The outer inclined surface 3141 is inclined in such a manner that a position in the key insertion and removal direction comes closer to the case contact surface 212 with a decrease in distance to the grip portion 21.

The first engagement plane 3142 and the second engagement plane 3143 are planes perpendicular to the key insertion and removal direction. The first engagement plane 3142 is provided closer to the tip end of the release hook 31 than the second engagement plane 3143. In other words, the first engagement plane 3142 is provided to a position closer to a hook facing side surface 215, which is a side surface of the grip portion 21 facing the release hook 31, than the second engagement plane 3143.

The first engagement plane 3142 and the second engagement plane 3143 are provided at different positions in the key insertion and removal direction. The first engagement plane 3142 is provided in a key removal direction in the key insertion and removal direction (that is, closer to an outer periphery of the case 10) in comparison with the second engagement plane 3143.

Both of the first engagement plane 3142 and the second engagement plane 3143 are lock engagement planes (engagement planes of a lock portion), and a step in the key insertion and removal direction is formed between the first engagement plane 3142 and the second engagement plane 3143. Hence, the lock engagement planes form a stepped plane structure in the present embodiment.

The inner inclined surface 3144 corresponding to a coupling surface is a plane coupling the first engagement plane 3142 and the second engagement plane 3143. Contrary to the outer inclined surface 3141, the inner inclined surface 3144 is inclined in such a manner that a position in the key insertion and removal direction becomes more distant from the case contact surface 212 with a decrease in distance to the hook facing side surface 215 of the grip portion 21.

[Key Insertion Operation]

An operation to insert the mechanical key 20 into the case 10 will now be described. While the mechanical key 20 is being inserted into the case 10, the case contact surface 212 makes contact with the outer inclined surface 3141 provided to the tip end portion 314 of the release hook 31. By moving the mechanical key 20 further in the key insertion direction while the case contact surface 212 is in contact with the outer inclined surface 3141, the case contact surface 212 presses the outer inclined surface 3141. Eventually, the release hook 31 moves in a direction to compress the spring 32 from a state where the stopper contact surface 3112 of the center portion 311 is in contact with the hook contact surface 331 of the stopper 33 as is shown in FIG. 4.

Figure 5:
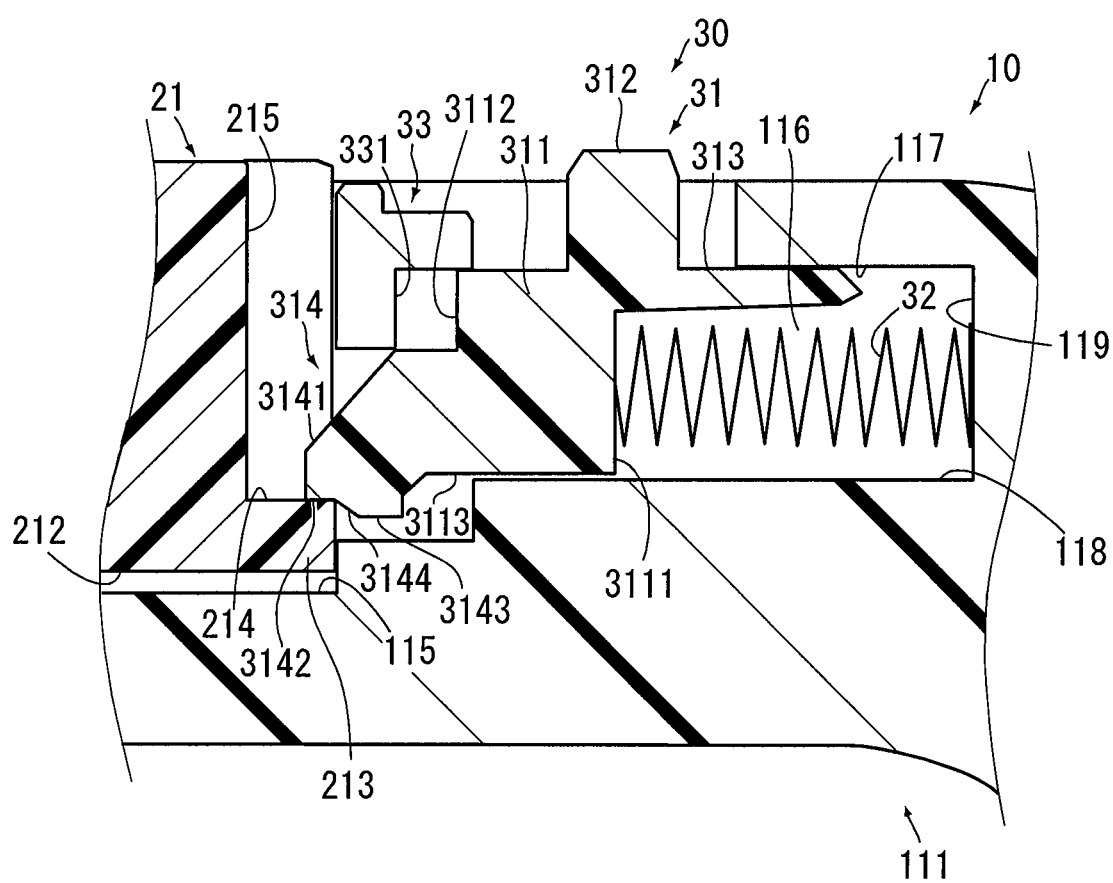
FIG. 5 is a view of the mechanical key inserted until the mechanical key is turned into a lock state for a first time.

By moving the grip portion 21 further in the key insertion direction, the engagement plane 214 of the grip portion 21 and the first engagement plane 3142 provided to the tip end portion 314 of the release hook 31 are located at a same position in the key insertion and removal direction. Because the release hook 31 is energized in the direction to the grip portion 21 by the spring 32, the release hook 31 moves in the direction to the grip portion 21 when the engagement plane 214 and the first engagement plane 3142 are located at the same position in the key insertion and removal direction. Hence, as is shown in FIG. 5, the engagement plane 214 and the first engagement plane 3142 are in contact with each other. The mechanical key 20 is thus restrained from falling out of the case 10.

Figure 6:
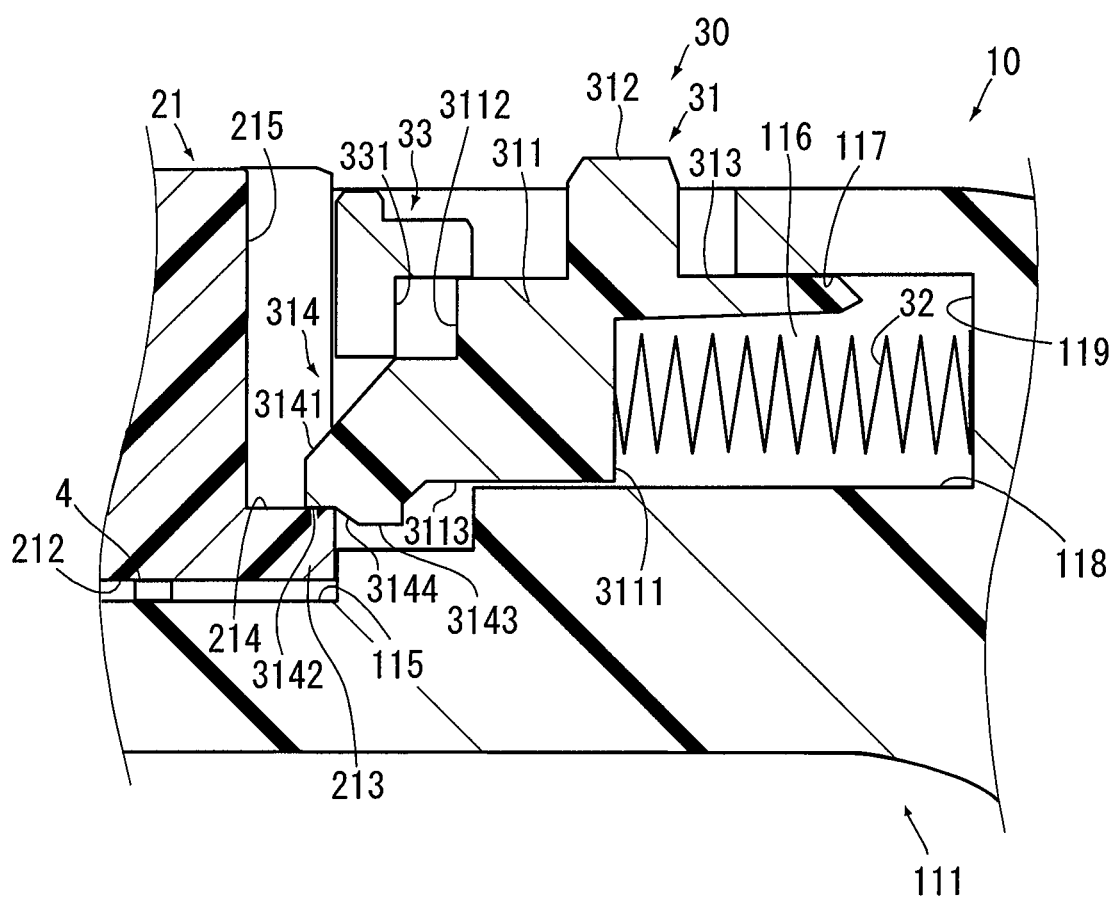
FIG. 6 is a view indicating that the lock state can be achieved even in presence of foreign matter.

In the state shown in FIG. 5, a clearance is left between the case contact surface 212 of the grip portion 21 and the grip facing surface 115 of the case 10. Hence, as is shown in FIG. 6, the lock state can be achieved even in presence of foreign matter 4, such as dust, between the case contact surface 212 and the grip facing surface 115.

By moving the mechanical key 20 in the state shown in FIG. 5 further in the key insertion direction, a point of contact between an end of the engagement plane 214 and the inner inclined surface 3144 moves in a direction to the second engagement plane 3143 while the end of the engagement plane 214 keeps making contact with the inner inclined surface 3144.

While the case contact surface 212 and the grip facing surface 115 are in contact with each other, the engagement plane 214 and the second engagement plane 3143 are located at a same position in the key insertion and removal direction. Hence, the release hook 31 at the position of FIG. 5 moves further in the direction to the grip portion 21. A state shown in FIG. 3 is thus achieved. In the state shown in FIG. 3, the second engagement plane 3143 of the release hook 31 and the engagement plane 214 of the grip portion 21 are in contact with each other. The state shown in FIG. 3 is also the lock state. Different from the state shown in FIG. 5, the tip end of the grip portion 21 does not protrude from the case 10 in the state shown in FIG. 3. Hence, design is more sophisticated in the state shown in FIG. 3 than in the state shown in FIG. 5.

Summary of First Embodiment

In the first embodiment described above, the release hook 31 includes the first engagement plane 3142 and the second engagement plane 3143 both engageable with the engagement plane 214 of the grip portion 21. The first engagement plane 3142 and the second engagement plane 3143 are provided at different positions in the key insertion and removal direction while each of the first engagement plane 3142 and the second engagement plane 3143 is engageable with the engagement plane 214 of the grip portion 21.

Hence, even when the mechanical key 20 is not completely inserted in the storing hole 130 due to the foreign matter 4, such as dust, falling out of the mechanical key 20 can be restrained as long as the second engagement plane 3143 engages with the engagement plane 214.

The engagement plane 214, the first engagement plane 3142, and the second engagement plane 3143 are planes perpendicular to the key insertion and removal direction. Accordingly, when the mechanical key 20 in the lock state is pulled in the key removal direction, the release hook 31 does not move in a direction away from the bar portion 22 of the mechanical key 20 and hence the mechanical key 20 does not move in a direction to fall out of the case 10. Consequently, when the mechanical key 20 is pulled, the mechanical key 20 can be also restrained from rattling.

In the present embodiment, the inner inclined surface 3144 is provided between the first engagement plane 3142 and the second engagement plane 3143. Owing to the configuration as above, while the mechanical key 20 is being inserted into the case 10, a force required to make the engagement plane 214 of the grip portion 21 engaging with the first engagement plane 3142 engage with the second engagement plane 3143 can be smaller.

Second Embodiment

A second embodiment will now be described. In a description of the second and following embodiments below, elements labeled with same reference numerals are same as the elements described in any preceding embodiment unless specified otherwise. When only a part of the configuration is described, the description in any preceding embodiment is applied for a rest of the configuration.

Figure 7:
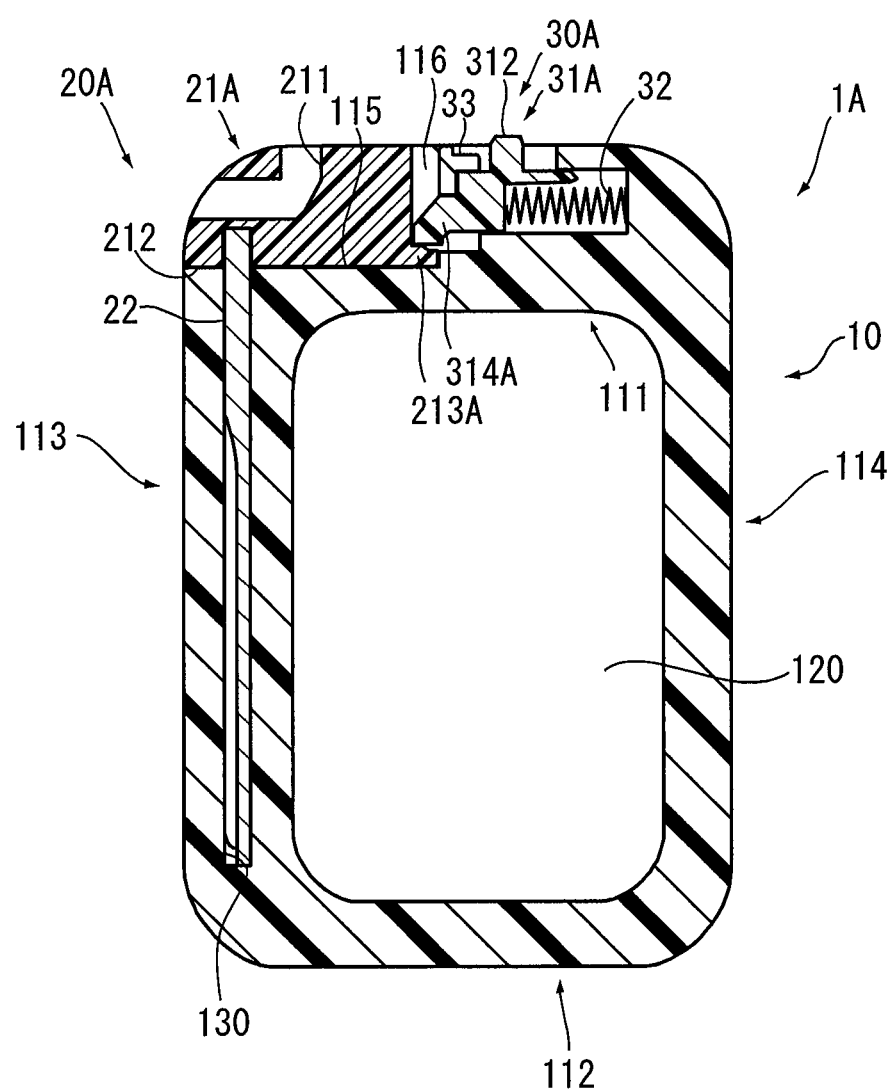
FIG. 7 is a sectional view of an electronic key according to a second embodiment of the present disclosure.

An electronic key 1A of the second embodiment has a configuration shown in FIG. 7. In the electronic key 1A, a configuration of a protrusion 213A provided to a grip portion 21A of a mechanical key 20A and a configuration of a tip end portion 314A of a release hook 31A provided to a lock portion 30A are different, respectively, from the configuration of the protrusion 213 and the configuration of the tip end portion 314 of the first embodiment above. The following will describe the configurations different from the configurations of the first embodiment above by using FIG. 8.

[Description of Configurations Different from Configurations of First Embodiment]

Figure 8:
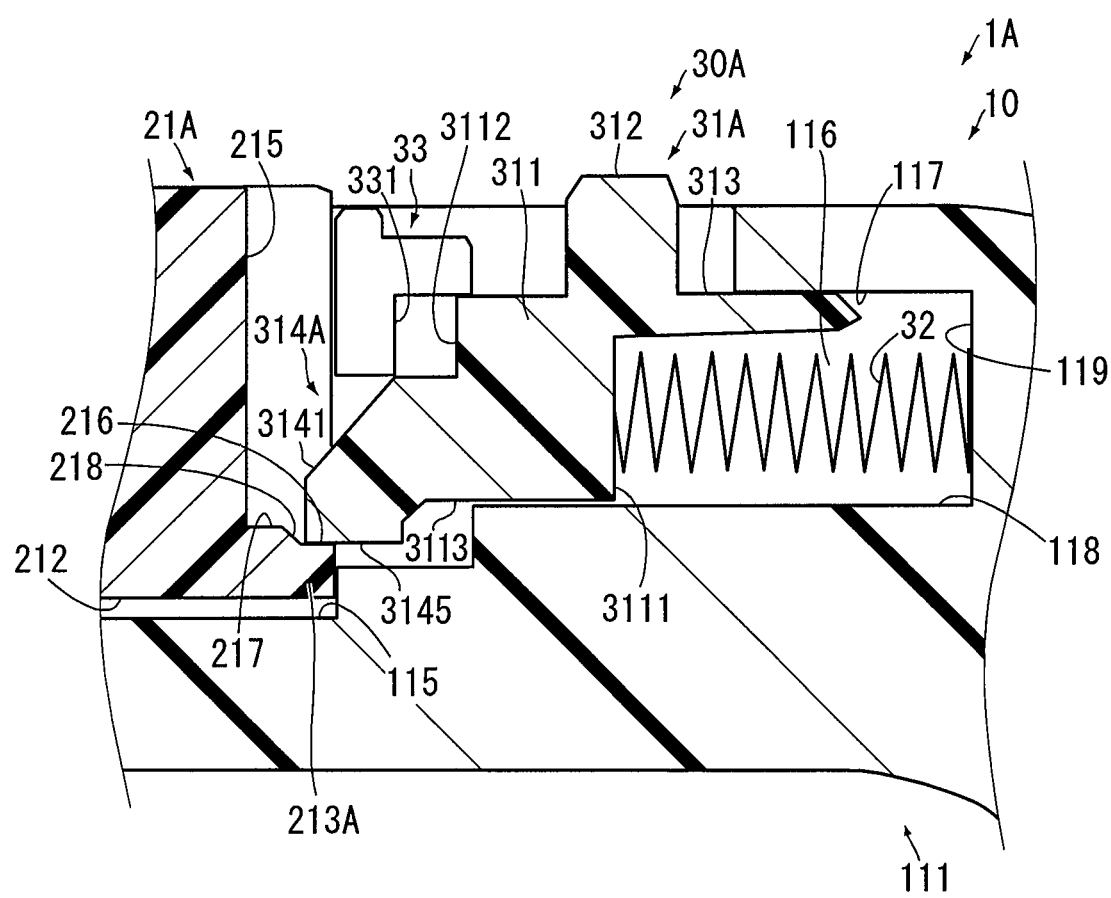
FIG. 8 is an enlarged sectional view of a vicinity of a lock portion of FIG. 7.

As is shown in FIG. 8, the protrusion 213A provided to the grip portion 21A protrudes in a direction to the lock portion 30A from an end of the grip portion 21A on a side where a case contact surface 212 is provided.

A surface of the protrusion 213A on an outer side of a case 10 is provided with a first engagement plane 216 and a second engagement plane 217, both of which engage with the lock portion 30A. Both of the first engagement plane 216 and the second engagement plane 217 are planes perpendicular to a key insertion and removal direction.

The first engagement plane 216 is provided closer to the release hook 31A than the second engagement plane 217. In other words, the first engagement plane 216 is provided on an outer side of the grip portion 21A, that is, at a position more distant from a hook facing side surface 215 than the second engagement plane 217.

The first engagement plane 216 and the second engagement plane 217 are provided at different positions in the key insertion and removal direction. The first engagement plane 216 is provided in a key insertion direction in the key insertion and removal direction in comparison with the second engagement plane 217.

Both of the first engagement plane 216 and the second engagement plane 217 are key engagement planes and a step in the key insertion and removal direction is formed between the first engagement plane 216 and the second engagement plane 217. Hence, the key engagement planes form a stepped plane structure in the second embodiment.

The first engagement plane 216 and the second engagement plane 217 are coupled to each other by a coupling surface 218. The coupling surface 218 is a plane inclined in such a manner that a position in the key insertion and removal direction becomes more distant from the case contact surface 212 with a decrease in distance to a hook facing side surface 215.

In the first embodiment above, the tip end portion 314 of the release hook 31 includes the first engagement plane 3142 and the second engagement plane 3143 as a surface engaging with the engagement plane 214 provided to the protrusion 213 of the grip portion 21. By contrast, the tip end portion 314A of the release hook 31A includes a single engagement plane 3145 as a surface engaging with the first engagement plane 216 and the second engagement plane 217 provided to the protrusion 213A of the grip portion 21A. In the second embodiment, the engagement plane 3145 corresponds to the lock engagement plane and the release hook 31A corresponds to the restraint member.

The engagement plane 3145 is located at a same position in the key insertion and removal direction as the second engagement plane 3143 of the first embodiment above. An area of the engagement plane 3145 is equal to a sum of an area of the first engagement plane 3142, an area of the second engagement plane 3143, and an area of the inner inclined surface 3144 projected onto a plane including the second engagement plane 3143 of the first embodiment above.

[Key Insertion Operation]

An operation to insert the mechanical key 20A into the case 10 will now be described. When the first engagement plane 216 and the engagement plane 3145 are located at a same position in the key insertion and removal direction while the mechanical key 20A is being inserted into the case 10, the first engagement plane 216 and the engagement plane 3145 engage with each other as is shown in FIG. 8. Accordingly, a lock state in which the grip portion 21A of the mechanical key 20A is restrained from moving in a direction away from the case 10 can be achieved.

In the state shown in FIG. 8, a clearance is left between the case contact surface 212 of the grip portion 21A and a grip facing surface 115 of the case 10. Hence, the lock state can be achieved even in presence of foreign matter, such as dust, between the case contact surface 212 and the grip facing surface 115.

By moving the mechanical key 20A in the state shown in FIG. 8 further in the key insertion direction, a point of contact between an end of the engagement plane 3145 and the coupling surface 218 is moved in a direction to the second engagement plane 217 while the end of the engagement plane 3145 keeps making contact with the coupling surface 218.

Figure 9:
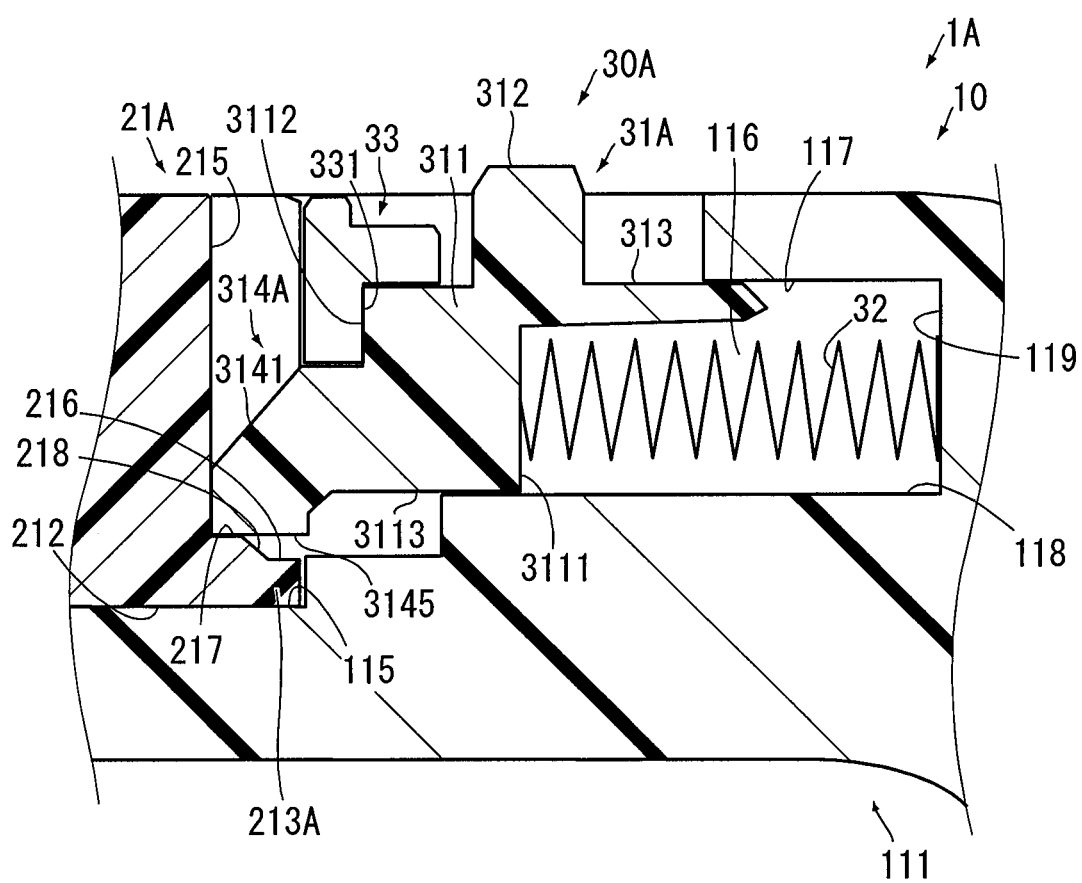
FIG. 9 is an enlarged sectional view of the vicinity of the lock portion when a mechanical key is completely stored in a case in the second embodiment.

While the case contact surface 212 and the grip facing surface 115 are in contact with each other, the second engagement plane 217 and the engagement plane 3145 are located at a same position in the key insertion and removal direction. The release hook 31A located at a position shown in FIG. 8 thus moves further in the direction to the grip portion 21A. The state shown in FIG. 9 is thus achieved. In the state shown in FIG. 9, the second engagement plane 217 and the engagement plane 3145 are in contact with each other. The state shown in FIG. 9 is also the lock state. Design is more sophisticated in the state shown in FIG. 9 than in the state shown in FIG. 8 because the tip end of the grip portion 21A does not protrude from the case 10.

Third Embodiment

Figure 10:
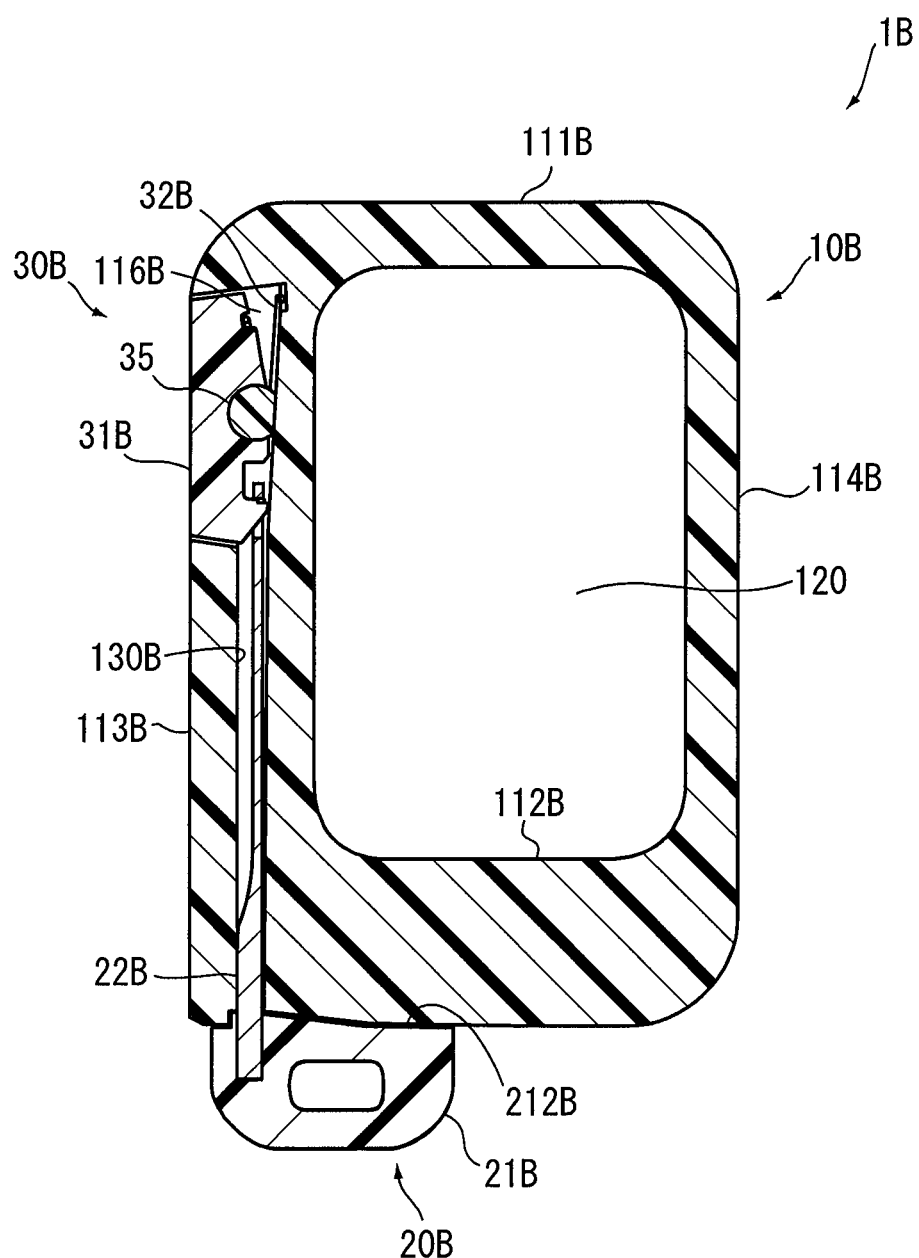
FIG. 10 is a sectional view of an electronic key according to a third embodiment of the present disclosure.

A configuration of an electronic key 1B of a third embodiment is shown in FIG. 10. FIG. 10 is a view corresponding to FIG. 2 of the first embodiment above. A case 10B includes short wall portions 111B and 112B and long wall portions 113B and 114B longer than the short wall portions 111B and 112B. An electronic component is stored in a space defined by the short wall portions 111B and 112B, the long wall portions 113B and 114B, a bottom portion 120, and an unillustrated lid portion facing the bottom portion 120. The electronic component is not shown in FIG. 10, either.

A mechanical key 20B includes a grip portion 21B and a bar portion 22B. The grip portion 21B is made of resin and the bar portion 22B is made of metal. A base of the bar portion 22B is inserted in the grip portion 21B.

A storing hole 130B in which to store the bar portion 22B of the mechanical key 20B is provided from the short wall portion 112B to the long wall portion 113B of the case 10B. The storing hole 130B has an opening in an end face of the short wall portion 112B.

A state in which the bar portion 22B of the mechanical key 20B is stored in the storing hole 130B is a state in which the mechanical key 20B is stored in the case 10B. In the third embodiment, the grip portion 21B protrudes from the case 10B even when the mechanical key 20B is stored in the case 10B. While the bar portion 22B is stored in the storing hole 130B at a normal position, a case contact surface 212B of the grip portion 21B, from which the bar portion 22B protrudes, is in contact with the short wall portion 112B.

The long wall portion 113B of the case 10B couples to the storing hole 130B to define a lock portion storing space 116B. A lock portion 30B is stored in the lock portion storing space 116B. The lock portion 30B includes a release hook 31B corresponding to the restraint member, and a spring 32B.

[Configuration of Lock Portion 30B]

A configuration of the lock portion 30B will now be described by using FIG. 11. The release hook 31B of the third embodiment is of a rocking type and is capable of rocking about a shaft 35 located at or near a center of the release hook 31B and functioning as a rocking shaft. The spring 32B is a torsion coil spring, and one end is in contact with a bottom of the lock portion storing space 116B while the other end is stored in a storing portion 312B provided to a back surface 311B of the release hook 31B. An unillustrated coil of the spring 32B is wound around the shaft 35.

The storing portion 312B is provided to the release hook 31B at an end opposite to the grip portion 21B in a key insertion and removal direction. Because the other end of the spring 32B is stored in the storing portion 312B and the coil of the spring 32B is wound around the shaft 35, the release hook 31B is energized in a direction for the storing portion 312B of the release hook 31B to move away from a bottom surface of the lock portion storing space 116B.

A protruding portion 313B is provided to the release hook 31B at an end opposite to the storing portion 312B. The protruding portion 313B protrudes from a base 314B of the release hook 31B in a direction to the bottom surface of the lock portion storing space 116B.

The protruding portion 313B includes an inclined surface 315B, a first engagement plane 316B, a second engagement plane 317B, and a coupling surface 318B. The inclined surface 315B is a surface inclined with respect to the key insertion and removal direction independently of a rocking angle of the release hook 31B. To be more specific, the inclined surface 315B is inclined more toward the bottom surface of the lock portion storing space 116B in a key insertion direction in the key insertion and removal direction. The term, "being inclined", means an angle at which a surface is neither horizontal nor perpendicular.

Both of the first engagement plane 316B and the second engagement plane 317B are planes engaging with an engagement plane 221B provided at a tip end of the bar portion 22B of the mechanical key 20B. Angles of the first engagement plane 316B and the second engagement plane 317B with respect to an axial direction of the bar portion 22B of the mechanical key 20B vary with a rotation angle of the release hook 31B. It should be noted, however, that both of the first engagement plane 316B and the second engagement plane 317B become perpendicular to the key insertion and removal direction when located at positions where either the first engagement plane 316B or the second engagement plane 317B engages with the engagement plane 221B.

The first engagement plane 316B is provided closer to the base 314B of the release hook 31B than the second engagement plane 317B. The first engagement plane 316B and the second engagement plane 317B are provided at different positions in the key insertion and removal direction. The first engagement plane 316B is provided in a key removal direction in the key insertion and removal direction, that is, at a position closer to the opening of the storing hole 130B in the end face of the short wall portion 112B in comparison with the second engagement plane 317B.

Both of the first engagement plane 316B and the second engagement plane 317B are hook engagement planes and a step in the key insertion and removal direction is formed between the first engagement plane 316B and the second engagement plane 317B. Hence, the hook engagement planes form a stepped plane structure in the third embodiment.

The coupling surface 318B couples the first engagement plane 316B and the second engagement plane 317B. A through-hole 222B is provided at a tip end of the bar portion 22B of the mechanical key 20B to penetrate through the bar portion 22B in a direction crossing an axis at right angles. A part of a side surface of the through-hole 222B forms the engagement plane 221B. The engagement plane 221B, which corresponds to the key engagement plane, is perpendicular to the key insertion and removal direction, that is, an axial direction of the bar portion 22B and provided to the bar portion 22B from end to end in a thickness direction.

[Key Insertion Operation]

An operation to insert the mechanical key 20B into the case 10B will now be described. The tip end of the bar portion 22B of the mechanical key 20B makes contact with the inclined surface 315B of the release hook 31B while the mechanical key 20B is being inserted into the case 10B. By inserting the mechanical key 20B further into the case 10B, the inclined surface 315B of the release hook 31B is pressed by the tip end of the bar portion 22B of the mechanical key 20B. The release hook 31B thus moves by rotating about the shaft 35 as a rocking center in a direction for a tip end of the protruding portion 313B to move away from the bottom surface of the lock portion storing space 116B.

Figure 12:
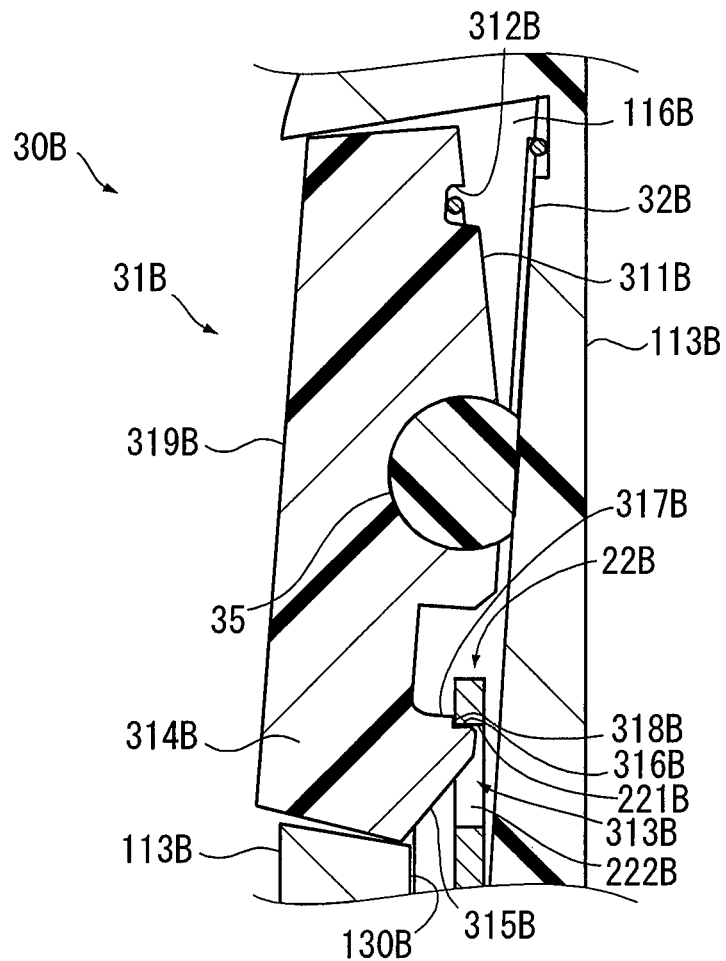
FIG. 12 is a view of a mechanical key inserted until the mechanical key is turned into a lock state for a first time.

Owing to the rotational movement as above, the tip end of the bar portion 22B of the mechanical key 20B is allowed to pass by the tip end of the protruding portion 313B. By inserting the mechanical key 20B still further into the case 10B, the engagement plane 221B provided at the tip end of the bar portion 22B and the first engagement plane 316B provided to the release hook 31B are located at a same position in the key insertion and removal direction. Hence, as is shown in FIG. 12, the engagement plane 221B and the first engagement plane 316B engage with each other. A lock state in which the grip portion 21B of the mechanical key 20B is restrained from moving in a direction away from the case 10B can be thus achieved.

Figure 13:
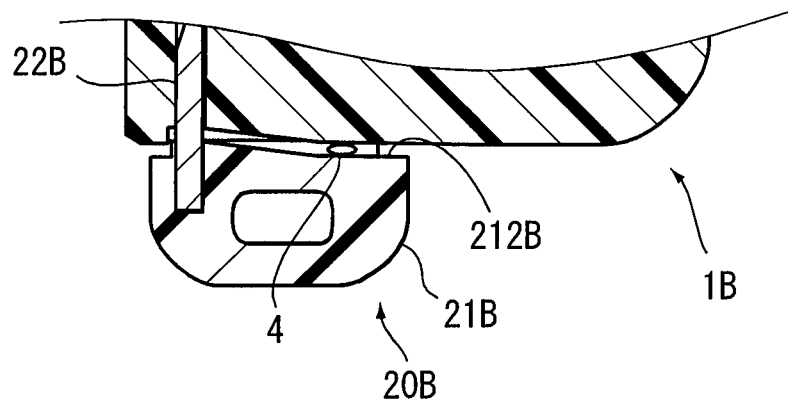
FIG. 13 is a view of a vicinity of a grip portion in a state of FIG. 12.

A vicinity of the grip portion 21B in the state shown in FIG. 12 is shown in FIG. 13. While the engagement plane 221B and the first engagement plane 316B are in engagement with each other, as is shown in FIG. 13, a clearance is left between the case contact surface 212B of the grip portion 21B and the short wall portion 112B. Hence, the lock state can be achieved even in presence of foreign matter 4, such as dust, between the case contact surface 212 and the short wall portion 112B.

By moving the mechanical key 20B in the state shown in FIG. 12 furthermore in the key insertion direction, the second engagement plane 317B and the engagement plane 221B are located at a same position in the key insertion and removal direction. Consequently, the release hook 31B at the rotated position of FIG. 12 moves by rotating in a direction for the protruding portion 313B to come closer to the bottom surface of the lock portion storing space 116B. A state shown in FIG. 11 is thus achieved.

Figure 11:
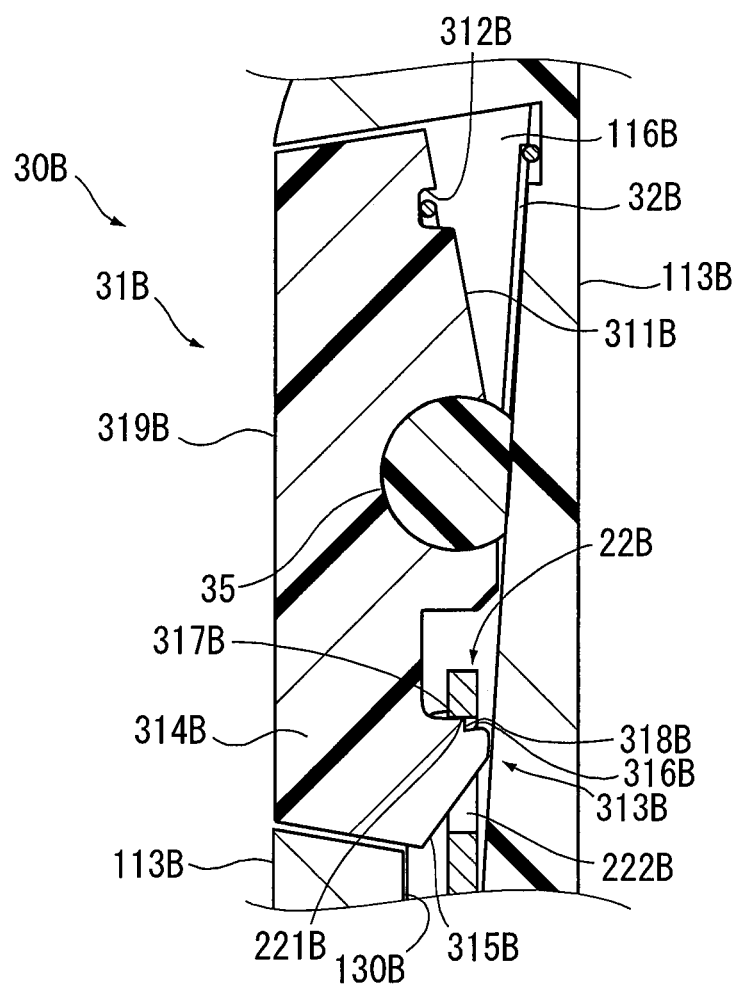
FIG. 11 is an enlarged sectional view of a vicinity of a lock portion of FIG. 10.

In the state shown in FIG. 11, the second engagement plane 317B and the engagement plane 221B are in contact with each other. The state shown in FIG. 11 is also the lock state. Design is more sophisticated in the state shown in FIG. 11 than in the state shown in FIG. 12 because a surface 319B of the release hook 31B does not protrude from the long wall portion 113B of the case 10B.

Fourth Embodiment

Figure 14:
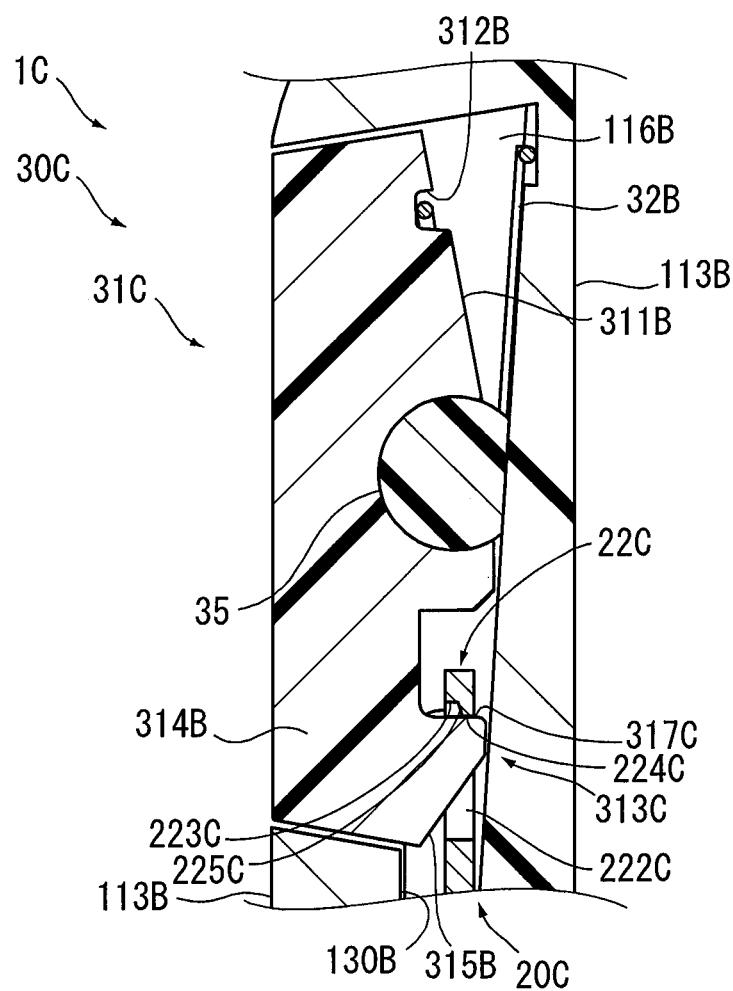
FIG. 14 is an enlarged sectional view of a vicinity of a lock portion of an electronic key according to a fourth embodiment of the present disclosure.

A configuration of an electronic key 1C of a fourth embodiment is shown in FIG. 14. FIG. 14 is a view corresponding to FIG. 11. A configuration not shown in FIG. 14 is same as the configuration of the electronic key 1B of the third embodiment above.

In the electronic key 1C, a configuration of a tip end of a bar portion 22C of a mechanical key 20C and a configuration of a protruding portion 313C of a release hook 31C provided to a lock portion 30C are different, respectively, from the configuration of the bar portion 22B and the configuration of the protruding portion 313B of the third embodiment above. The release hook 31C corresponds to the restraint member.

The bar portion 22C of the mechanical key 20C is provided with a through-hole 222C at a position same as the position of the through-hole 222B of the third embodiment above. In the third embodiment above, the single engagement plane 221B is provided to the through-hole 222B. By contrast, a first engagement plane 223C, a second engagement plane 224C, and a coupling surface 225C are provided in the fourth embodiment instead of the engagement plane 221B. Both of the first engagement plane 223C and the second engagement plane 224C are planes engaging with an engagement plane 317C provided to the protruding portion 313C. Both of the first engagement plane 223C and the second engagement plane 224C are planes perpendicular to a key insertion and removal direction, that is, planes perpendicular to an axial direction of the bar portion 22C.

While the mechanical key 20C is inserted in a case 10B, the first engagement plane 223C is located at a position closer to a base 314B of the release hook 31C than the second engagement plane 224C. The first engagement plane 223C and the second engagement plane 224C are provided at different positions in the key insertion and removal direction. The first engagement plane 223C is provided in a key insertion direction in the key insertion and removal direction, that is, at a position closer to a tip end of the bar portion 22C of the mechanical key 20C in comparison with the second engagement plane 224C.

Both of the first engagement plane 223C and the second engagement plane 224C are key engagement planes and a step is formed in the key insertion and removal direction between the first engagement plane 223C and the second engagement plane 224C. Hence, the key engagement planes form a stepped plane structure in the fourth embodiment.

The coupling surface 225C is a plane which couples the first engagement plane 223C and the second engagement plane 224C and is inclined to come closer to the base 314B of the release hook 31C with a decrease in distance to the tip end of the bar portion 22C.

The engagement plane 317C is provided to the protruding portion 313C of the release hook 31C. The engagement plane 317C is provided instead of the first engagement plane 316B, the second engagement plane 317B, and the coupling surface 318 provided to the protruding portion 313B of the third embodiment above. The engagement plane 317C corresponds to the lock engagement plane.

[Key Insertion Operation]

Figure 15:
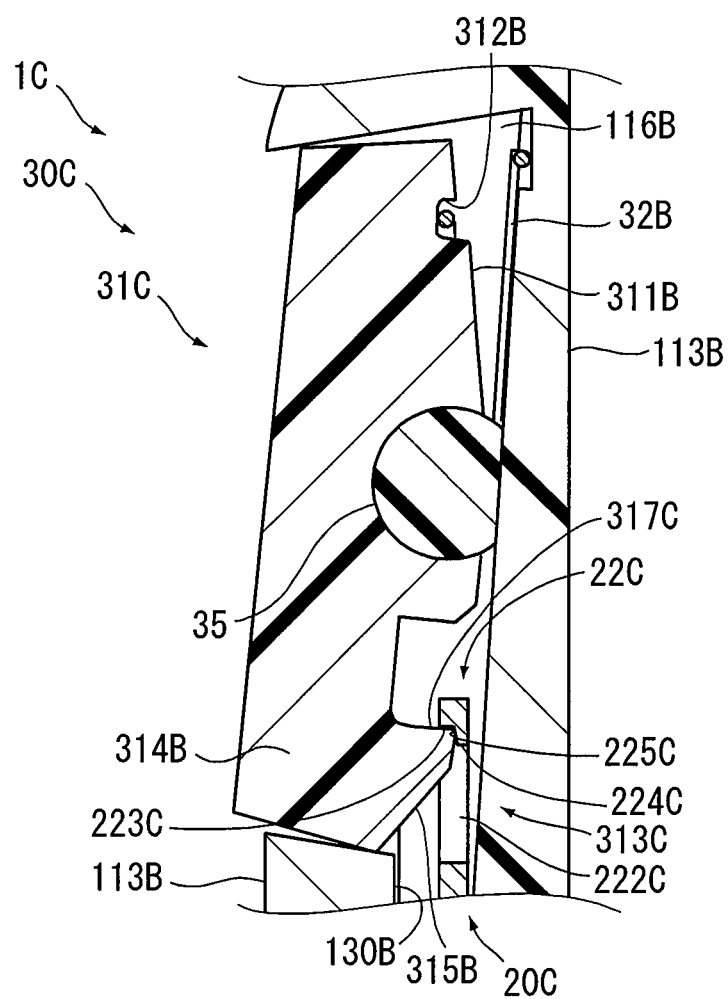
FIG. 15 is a view of a mechanical key inserted until the mechanical key is turned into a lock state for a first time.

An operation to insert the mechanical key 20C into the case 10B will now be described. While the mechanical key 20C is being inserted into the case 10B, the first engagement plane 223C provided at the tip end of the bar portion 22C of the mechanical key 20C and the engagement plane 317C provided to the protruding portion 313C of the release hook 31C are located at a same position in the key insertion and removal direction. Hence, as is shown in FIG. 15, the engagement plane 317C and the first engagement plane 223C engage with each other. A lock state in which a grip portion of the mechanical key 20C is restrained from moving in a direction away from the case 10B can be thus achieved.

In the state shown in FIG. 15, a clearance is left between the grip portion of the mechanical key 20C and the case 10B as in the third embodiment above. Hence, the lock state can be achieved even in presence of foreign matter, such as dust, in the clearance.

By moving the mechanical key 20C in the state shown in FIG. 15 further in the key insertion direction, the second engagement plane 224C and the engagement plane 317C are located at a same position in the key insertion and removal direction. The release hook 31C at the rotated position of FIG. 15 thus moves by rotating in a direction for the protruding portion 313C to come closer to a bottom surface of a lock portion storing space 116B. A state shown in FIG. 14 is thus achieved.

In the state shown in FIG. 14, the second engagement plane 224C and the engagement plane 317C are in contact with each other. The state shown in FIG. 14 is also the lock state.

First Modification

In the first through fourth embodiments described above, the configuration includes either a combination of a single key engagement plane and a plurality of lock engagement planes or a combination of a plurality of key engagement planes and a single lock engagement plane. However, the configuration may include a plurality of key engagement planes and a plurality of lock engagement planes.

Second Modification

In the first through fourth embodiments described above, either the key engagement plane or the lock engagement plane forming the stepped plane structure includes two engagement planes. However, three or more engagement planes may be included.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

The invention claimed is:

1. An electronic key comprising:
a mechanical key having a bar portion;
a case in which to store the mechanical key in a removable manner in an axial direction of the bar portion; and
a restraint member provided to the case and restraining the mechanical key from falling out of the case, wherein
the mechanical key includes a key engagement plane which is a plane perpendicular to the axial direction of the bar portion in a lock state in which the mechanical key is restrained from falling out of the case by the restraint member,
the restraint member includes a lock engagement plane which is a plane perpendicular to the axial direction of the bar portion in the lock state and engages with the key engagement plane,
at least one of the key engagement plane or the lock engagement plane has a first engagement plane and a second engagement plane perpendicular to the axial direction of the bar portion,
the first engagement plane and the second engagement plane form a stepped plane structure in which the first engagement plane and the second engagement plane are offset from each other in the axial direction of the bar portion, and
the first engagement plane and the second engagement plane are engageable with the other one of the key engagement plane and the lock engagement plane.

2. The electronic key according to claim 1, wherein
the restraint member is movable in a direction perpendicular to the axial direction of the bar portion of the mechanical key in a state where the mechanical key is stored in the case.

3. The electronic key according to claim 1, wherein
the restraint member is capable of rocking about a rocking shaft, and
the lock engagement plane changes an angle with respect to the axial direction of the bar portion of the mechanical key with a rocking angle of the restraint member and becomes perpendicular to the axial direction of the bar portion in the lock state.

4. The electronic key according to claim 1, wherein
the plurality of engagement planes forming the stepped plane structure include two adjacent engagement planes which are coupled by a coupling surface inclined with respect to the axial direction of the bar portion.

5. The electronic key according to claim 1, wherein
one of the key engagement plane and the lock engagement plane forms the stepped plane structure and the other one of the key engagement plane and the lock engagement plane has a single plane engaged with the one of the key engagement plane and the lock engagement plane.

6. The electronic key according to claim 5, wherein
the mechanical key includes a grip portion coupled to the bar portion, at least a part of the grip portion is exposed from the case and is grippable by a user,
the grip portion includes the key engagement plane, and
the lock engagement plane forms the stepped plane structure.

7. The electronic key according to claim 5, wherein
the mechanical key includes a grip portion coupled to the bar portion, at least a part of the grip portion is exposed from the case and is grippable by a user,
the grip portion includes the key engagement plane, and
the key engagement plane forms the stepped plane structure.

8. The electronic key according to claim 5, wherein
the mechanical key includes the key engagement plane at a tip end of the bar portion, and
the lock engagement plane forms the stepped plane structure.

9. The electronic key according to claim 5, wherein
the mechanical key includes the key engagement plane at a tip end of the bar portion, and
the key engagement plane forms the stepped plane structure.

* * * * *